(12) United States Patent
Wallace (10) Patent No.: US 8,153,242 B2
(45) Date of Patent: Apr. 10, 2012

(54) MULTI-LAYER IMPACT RESISTANT BUMPER

(75) Inventor: James Wallace, Lynnfield, MA (US)

(73) Assignee: Boston Metal Products Corporation, Wakefield, MA (US)

( * ) Notice: Subject to any disclaimer, the term of this patent is extended or adjusted under 35 U.S.C. 154(b) by 280 days.

(21) Appl. No.: 12/236,107

(22) Filed: Sep. 23, 2008

(65) Prior Publication Data

US 2009/0022937 A1  Jan. 22, 2009

Related U.S. Application Data

(63) Continuation of application No. 10/954,432, filed on Sep. 30, 2004, now abandoned.

(60) Provisional application No. 60/508,102, filed on Oct. 2, 2003.

(51) Int. Cl.
*B32B 7/02* (2006.01)
*E04C 2/24* (2006.01)
*B29C 47/06* (2006.01)

(52) U.S. Cl. ............... 428/217; 52/717.05; 264/173.12

(58) Field of Classification Search ............ 428/98–99, 428/217, 67, 122, 31; 264/245, 260, 240, 264/173.12; 293/120, 128; 52/717.04, 717.05, 52/716.5
See application file for complete search history.

(56) References Cited

U.S. PATENT DOCUMENTS

| | | | |
|---|---|---|---|
| 4,911,971 A | 3/1990 | McCue et al. | |
| 5,160,105 A | 11/1992 | Miller | |
| 5,283,096 A | 2/1994 | Greenberg et al. | |
| 5,368,903 A | 11/1994 | Trier et al. | |
| 6,136,441 A | 10/2000 | MacGregor et al. | |
| 6,225,566 B1 | 5/2001 | Dienst | |
| 6,739,599 B1 * | 5/2004 | Uchimura et al. | ............ 277/628 |
| 2002/0061385 A1 | 5/2002 | Cook | |
| 2005/0005565 A1 | 1/2005 | McSharry et al. | |
| 2005/0095413 A1 | 5/2005 | Wallace | |

FOREIGN PATENT DOCUMENTS

EP    1 319 578    6/2003
(Continued)

OTHER PUBLICATIONS

Toyota Motor Corporation Environmental Report, pp. 36-38, (2002).

(Continued)

*Primary Examiner* — David Sample
*Assistant Examiner* — Prashant J Khatri
(74) *Attorney, Agent, or Firm* — Rissman Hendricks & Oliverio LLP (57) ABSTRACT

An impact resistant bumper device that is elongated along a longitudinal axis and mountable on a mounting member, the device having a cross-section having an open undersurface configuration comprising: a first layer of a first polymer material having a first hardness or durometer; a second layer of a second polymer material having a second hardness or durometer; wherein the first layer is formed into an inner core body having an outer surface and an open undersurface; wherein the second layer is formed into a layer bonded to the outer surface of the first layer; a third layer of a third polymer material formed into an elongated strip bonded to the undersurface of the first layer; and wherein the hardness or durometer of the first polymer is selected to be readily manually bendable and compressible.

17 Claims, 6 Drawing Sheets

FOREIGN PATENT DOCUMENTS

WO        WO 01/32471      *   5/2001

OTHER PUBLICATIONS

Levy, "Coextrusion and Dual Extrusion Technology," Advances in Plastics Technology, 1:6-17, (1981).

Wenguang, "Processing and Mechanical Properties of Recycled PVC and Homopolymer Blends with Virgin PVC," Journal of Applied Polymer Science, 59:759-767, (1996).

Voituron, "Recycling PVC Bottles and Pipes by Coextrusion," Recycling of PVC and Mixed Plastic Waste, ChemTec Publishing, pp. 51-62, (1996).

* cited by examiner

MULTI-LAYER IMPACT RESISTANT BUMPER

RELATED APPLICATIONS

This application is a continuation of U.S. patent application Ser. No. 10/954,432, filed Sep. 30, 2004, which claims the benefit of priority under 35 U.S.C. Sections 119 and/or 120 to the extent applicable to U.S. Provisional patent application Ser. No. 60/508,102 filed Oct. 2, 2003 for Multi-Layer Impact Resistant Bumper.

FIELD OF THE INVENTION

The present invention relates to multilayered products comprised of polymeric material and methods for producing such products. More particularly the invention relates to extruded or molded polymeric material products comprising layers that are bonded to each other, each layer comprising a polymeric material having a different selected durometer, hardness, bendability, impact resistance and/or melting point and/or concentration of dye and/or plasticizer materials.

BACKGROUND OF THE INVENTION

Extruded or injection molded products comprising two or more layers of polymer material are typically produced using complex molding or extrusion equipment and/or requiring complex processing steps that are difficult to reproduce from one extrusion or molding cycle to the next cycle. Processing methods for producing products comprised of polymer materials are typically developed by trial and error experimentation with a variety of different polymer materials having specific properties and molecular weights which, once determined are specific to production of the desired product and cannot be varied without substantially changing the end product.

SUMMARY OF THE INVENTION

The present invention relates to structural products that comprise a body of two or more polymer materials adhered or bonded to each other each polymer material having a different durometer, hardness, bendability, molecular weight or melting point or concentration of dye materials and/or plasticizers. The structural products of the invention are preferably formed as a multi-layered strip of polymer materials which is/are resistant to impact by solid objects and/or shock absorbent and resistant to shrinkage along the longitudinal or axial direction/length of the strip-form product.

In accordance with the invention there is provided an elongated strip of polymer material having a cross-section comprising:

a first inner core layer of a first polymer material having a selected configuration along the cross-section of the strip;

a second outer layer of a second polymer material bonded to an outer surface of the first inner core layer having a second selected configuration along the cross-section;

wherein the first polymer material has a softness, hardness or durometer selected to be manually bendable and compressible; and, wherein the second polymer material has a durometer or hardness greater than the durometer or hardness of the first polymer material.

The first and second layers are preferably co-extruded simultaneously through a die and bonded during their simultaneous co-extrusion. The second polymer material comprises a meltable polymer material that is melted for the first time after its initial manufacture during the co-extrusion. The first polymer material comprises a meltable polymer material that has been melted at least one once prior to the co-extrusion. The second polymer material typically contains at least one selected dye. The first polymer material typically contains at least two selected dyes.

The elongated strip may further comprise a third layer of a polymeric material bonded to an inner surface of the first layer. In such an embodiment, the first, second and third layers are co-extruded simultaneously through a die and bonded during their simultaneous co-extrusion. The third layer typically comprises a polymeric material that is first melted during the co-extrusion.

Further in accordance with the invention there is provided, an elongated strip of polymer material extruded in an extrusion cycle having a cross-section comprising:

a first inner core layer of a first polymer material having a selected configuration along the cross-section of the strip;

a second outer layer of a second polymer material bonded to an outer surface of the first inner core layer having a second selected configuration along the cross-section;

wherein the second polymer material is first melted during the extrusion cycle; and wherein the first polymer material has been melted at least once prior to the extrusion cycle.

In another aspect of the invention there is provided, a method of producing a structural body of two or more layers of polymeric material, the method comprising:

selecting a first polymer material that has been melted and cooled to solid form;

selecting a second polymer material that has not been melted;

extruding the first and second polymer materials simultaneously in molten form through a selected mold or die in first and second strips;

layering the simultaneously extruded first and second strips into contact with each other in their molten form upon exiting the selected mold or die in a configuration wherein the first strip as formed has an outer surface and the second strip is deposited on the outer surface of the first strip.

The step of selecting the first polymer material includes selecting a polymer material that contains a dye material and has been melted prior to the step of extruding and most preferably comprises selecting a mixture of two or more polymer materials that have been melted and cooled to solid form.

The step of extruding typically comprises forming the first polymeric material upon exiting the mold or die into a strip form having an outer visible surface and an undersurface wherein, the step of layering comprises layering the second extruded polymer onto the outer visible surface of the second polymer material.

The step of selecting the second polymer material typically comprises selecting a predetermined first polymer material having a first durometer, hardness, bendability or molecular weight wherein the predetermined polymer material converts upon melting and cooling to a converted state having a second durometer, hardness, bendablity or molecular weight that is less than the first durometer, hardness, bendability or molecular weight; and wherein the step of selecting the first polymer material comprises selecting the predetermined polymer material in the converted state.

The step of selecting the second polymer material may comprise selecting a predetermined second polymer material and the step of selecting the first polymer material may comprise selecting a mixture of two or more polymer materials each being comprised of the predetermined second polymer material and each containing a dye. In another aspect of the invention there is provided, a method of producing a structural body of two or more layers of polymeric material, the method comprising: selecting a first polymer material that has been melted and cooled to solid form;

selecting a second polymer material that has not been melted;

extruding the first and second polymer materials simultaneously in molten form through a selected mold or die into first, second and third strips;

layering the simultaneously extruded first, second and third strips into contact with each other in their molten form upon exiting the selected mold or die;

wherein the first strip is comprised of the first polymer material and the second and third strips are comprised of the second polymer material; and;

wherein the first strip is sandwiched between the second strip and the third strip.

In such an embodiment, the step of selecting the second polymer material may comprise selecting a predetermined polymer material having a first durometer, hardness, bendability or molecular weight wherein the predetermined polymer material converts upon melting and cooling to a converted state having a second durometer, hardness, bendablity or molecular weight that is less than the first durometer, hardness, bendability or molecular weight; and wherein the step of selecting the first polymer material may comprise selecting the predetermined polymer material in the converted state.

The step of selecting the second polymer material may comprise selecting a predetermined second polymer material wherein the step of selecting the first polymer material may comprise selecting a mixture of two or more polymer materials each being comprised of the predetermined second polymer material and each containing a dye.

DETAILED DESCRIPTION

Figure 1:
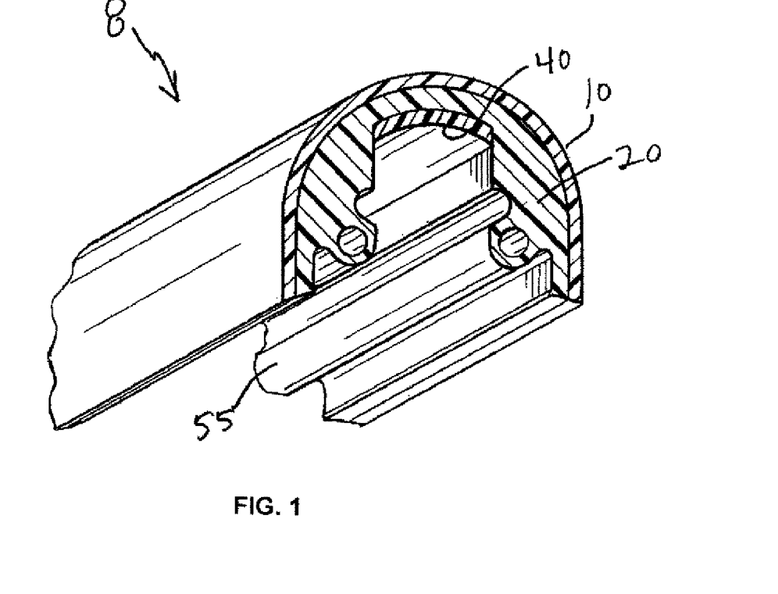
FIG. 1 is an underside/perspective cross sectional view of a composite material extruded bumper product according to the invention showing a solid strip form extruded body of material comprising a top outer layer of relatively hard polymer material, an inner or intermediate layer of relatively soft or less hard and more bendable polymer material and an undersurface strip of relatively hard, shrink resistant polymer material.
Figure 2:
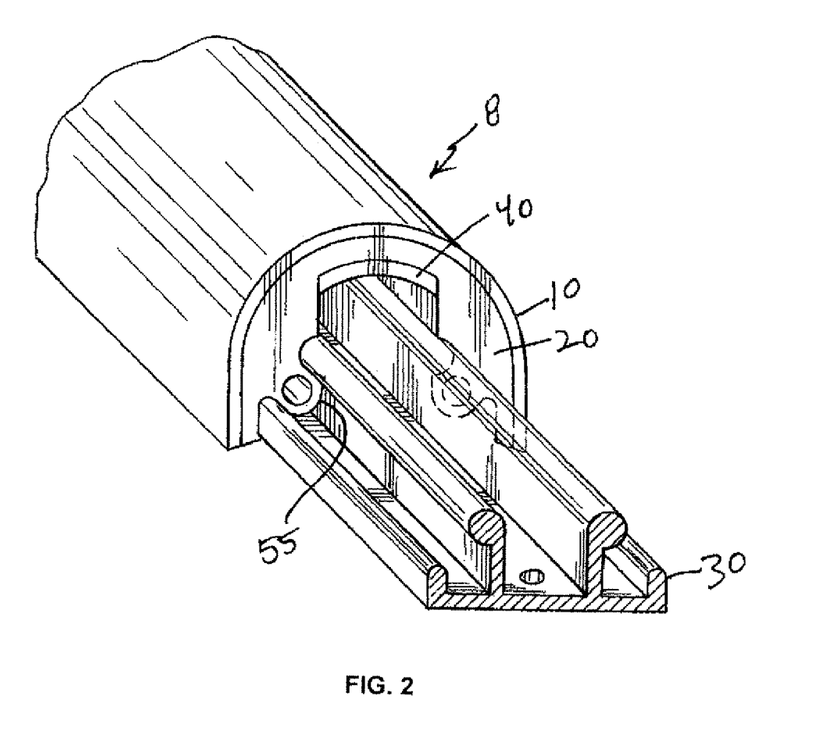
FIG. 2 is a topside/perspective cross sectional view of the Fig. product showing the product mounted or snap fit onto a railing.
Figure 9:
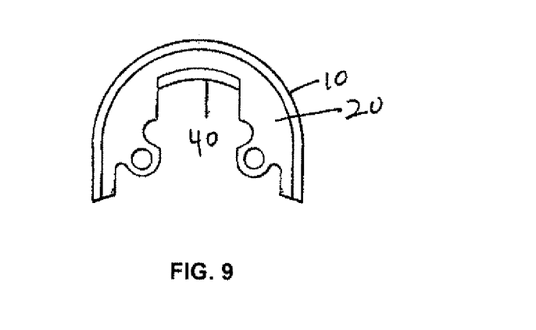
FIG. 9 is a front cross-sectional view of the FIG. 1 product.

FIGS. 1, 2 and 9 show an extruded length of a multi-strip formed bumper product 8 comprising an outer facing strip 10 of relatively hard polymer material, and intermediate strip 20 of relatively soft, rubbery or bendable polymer material and an undersurface strip 40 of relatively hard, rigid, shrink resistant polymer material. The outer coat or strip component/layer 10 is bonded during the extrusion process, preferably immediately upon exit from the final extrusion die, to the outer surface of the inner soft or manually bendable layer or strip 20 such that the end product assumes the outward visual appearance of a relatively hard, shiny surface as opposed to the inner layer 20 which cannot be visually seen when mounted on a rail 30 as shown in FIG. 2.

FIG. 2 shows the elongated strip-like product 8 mounted on a rigid, inflexible metal rail 30 by snap fitting of preformed tongues or detents 55 formed on the underside 57, FIG. 1, of the core 20 strip/layer onto a complementary receiving set of grooves or detents 59 formed on the outside surface the rail 30 shown in FIG. 2.

Figure 3:
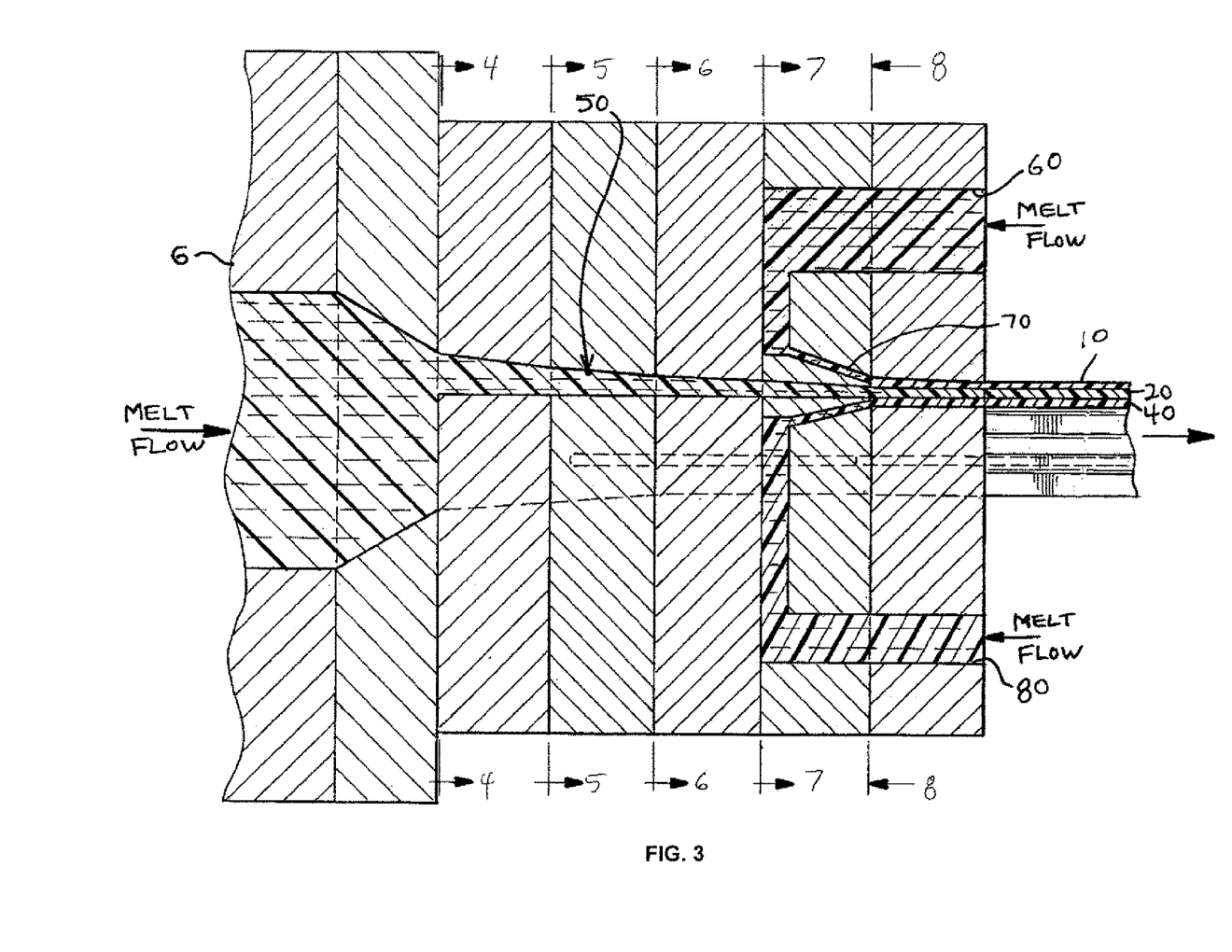
FIG. 3 is a schematic cross sectional view of the FIG. 1 product.
Figure 4:
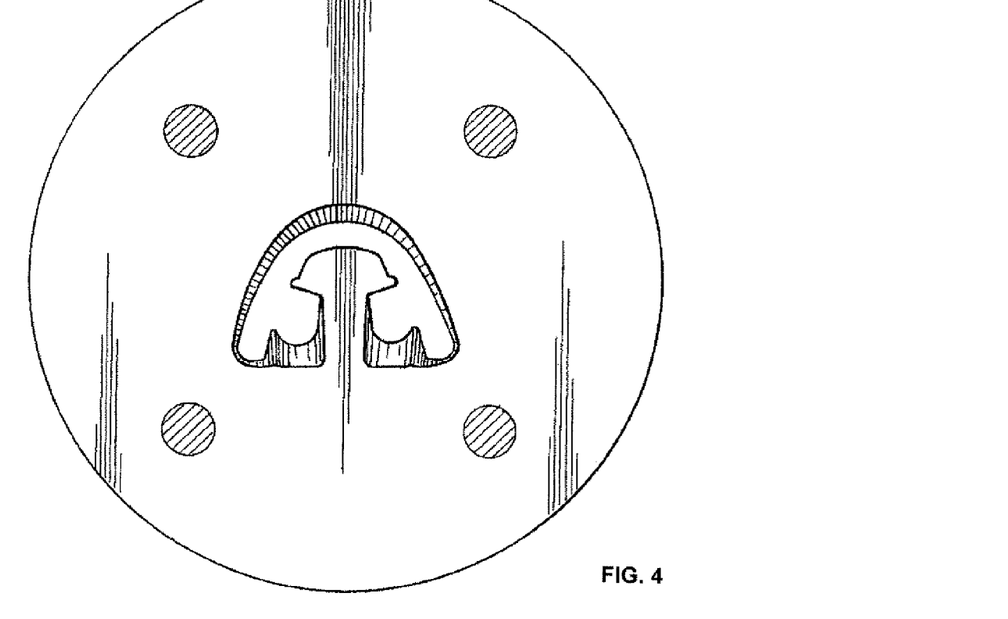
FIG. 4 is a rear elevational view of the first plate as seen along line 4-4 of FIG. 3.
Figure 5:
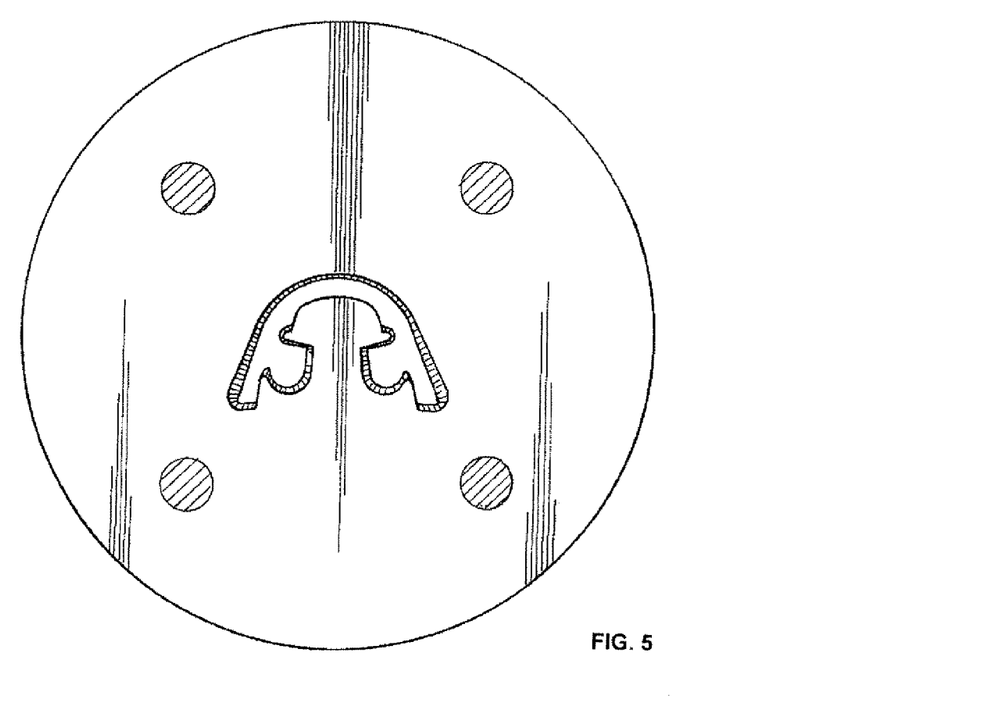
FIG. 5 is a rear elevational view of the second plate as seen along line 5-5 of FIG. 3.
Figure 6:
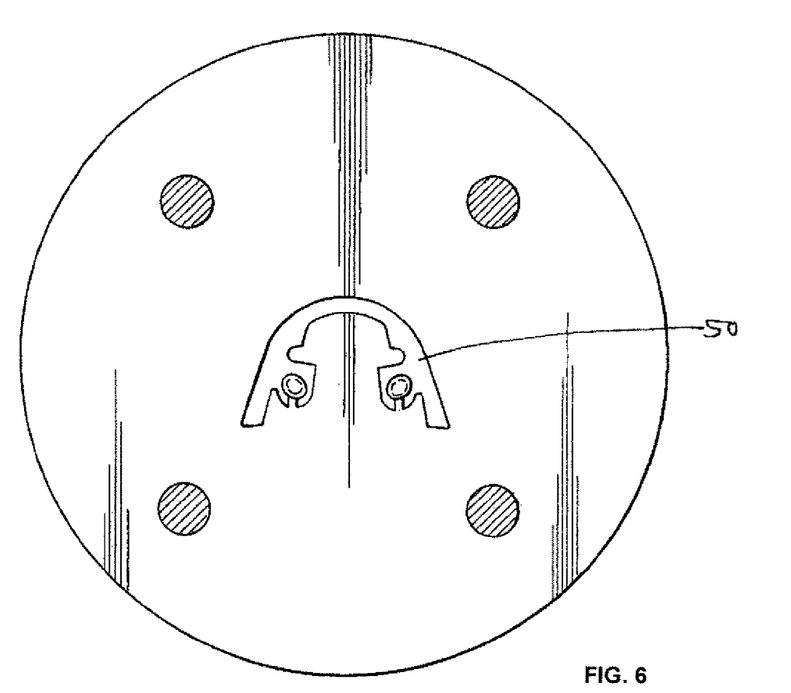
FIG. 6 is a rear elevational view of the third plate as seen along line 6-6 of FIG. 3.
Figure 7:
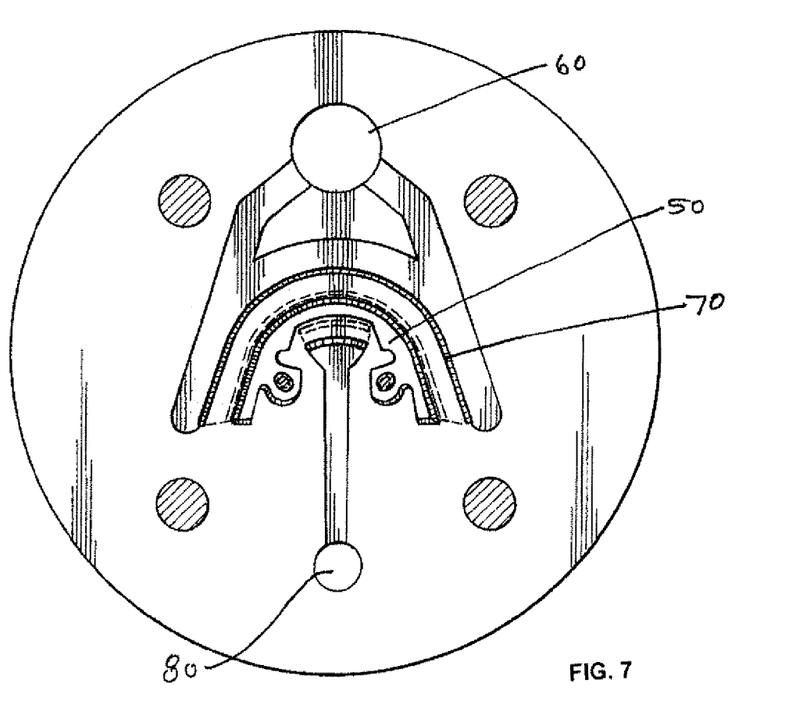
FIG. 7 is a rear elevational view of the fourth plate as seen along line 7-7 of FIG. 3.
Figure 8:
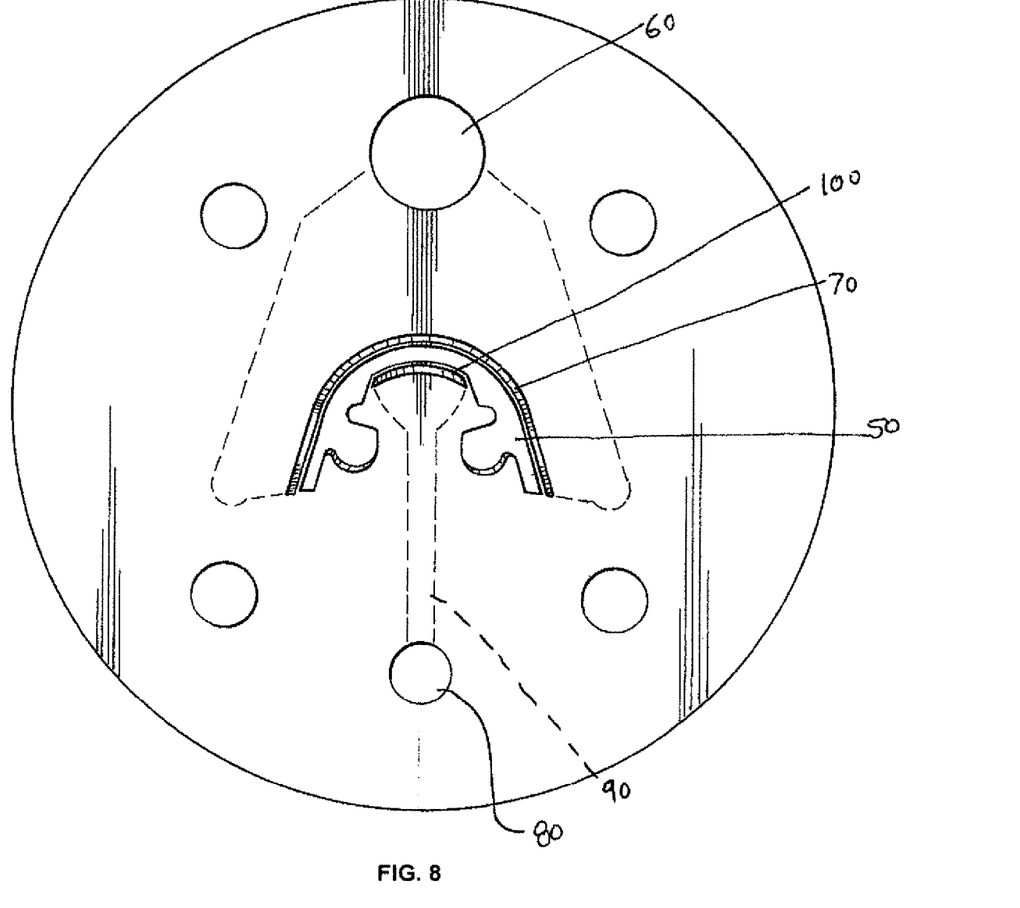
FIG. 8 is a front elevational view of the fourth plate as seen along line 8-8 of FIG. 3.

As shown in FIG. 3, the composite material feed for the core 20 is fed directly from the exit barrel 6 of the extruder through a central composite material bore 50 that extends through each of plates 1-4. The polymer feed for the cap coat 10 is fed through an aperture 60 extending from the exit side to the entrance side of plate 4 through plate 4, the feed then being routed through a bore 70, FIGS. 7, 8, 10 on the entrance side of plate 4 such that the cap coat material feed is ultimately routed through plate 4 and out the exit side of bore 70 on the exit side of plate 4, FIGS. 7, 8, 10 simultaneously with the extrusion of the feed material for the core 20 being routed through central bore 50. The polymer feed for the rigid non-shrink strip 40 is initially fed through an aperture 80 extending from the exit side to the entrance side of plate 4 through plate 4, the feed then being routed through a groove 90, FIGS. 7, 8, on the entrance side of plate 4 such that the rigid strip 40 material is ultimately routed through plate 4 and out the exit side of bore 100 on the exit side of plate 4 simultaneously with the extrusion of the feed material for the core 20 being routed through central bore 50 and the feed material for the cap coat 10 being routed through bore 70. Thus all three separate streams of polymer materials comprising the cap coat 10, core 20 and rigid undersurface strip 40 are simultaneously co-extruded and come into contact with each other in a molten state immediately upon exit from the exit side of plate 4. Once the three co-extruded streams of materials come into contact with each other in the molten state, the materials firmly bond to each other during and upon cooling to form the product shown in FIGS. 1, 2, 9.

FIG. 3 shows an additional end plate 5 that may be used together with the plates 1-4 assembly, the exact configuration and use of plates and equipment to effect the fluid material feed connections to the bores of plates 1-4 being a matter of design choice for the skilled artisan. The disclosed embodiment showing the use of four separate plates 1-4 is shown for purposes of example only. Any number or configuration of extrusion plates that achieve the function of routing of the thermoplastic polymer materials as shown may be used in the process. Positioning the exit ends of feed bores 50, 70, 80 in close adjacency to each other such that the separate streams of exiting polymer materials contact the surfaces of each other upon exit from the extrusion plates is most preferred so that the separate streams of exiting polymer materials come into contact with each other in a molten state immediately upon exit and thereby adhere to each other upon cooling from the molten state to a stable cooled state. When the separate streams of polymer materials come into contact with each other in the molten state the mating surfaces mix together somewhat at the point of contact and upon cooling to a crystalline state become essentially adhered to each other to form a the unitary product 8 shown in FIGS. 1, 2, 9. The separate streams of extruded polymer materials may alternatively be bonded to each other with a bonding material.

Figure 10:
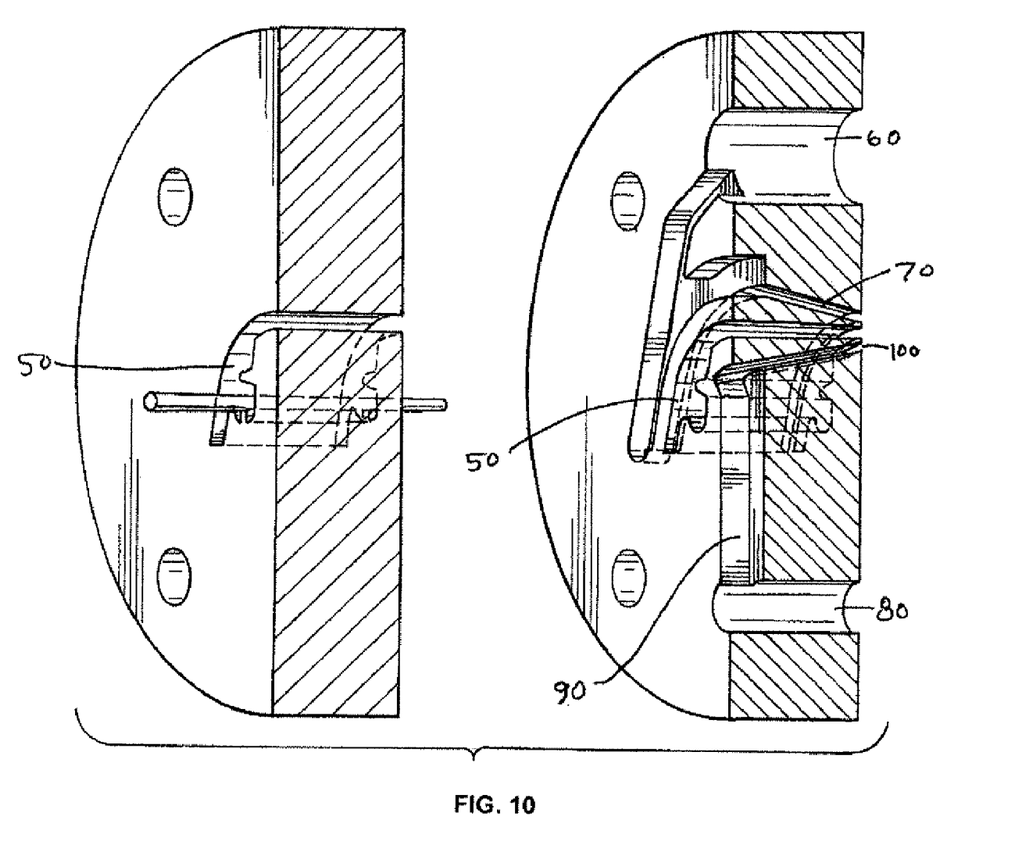
FIG. 10 is an exploded perspective view of the third and fourth plates shown in FIG. 3.

FIGS. 3, 10 show a solid rod or wire 200 that may be positioned through the end portion of bore 50 in the middle of the detent 55 configuration of the core 20 strip to enable an elongated aperture 25 to be formed within the body of the detent during the extrusion process to impart additional bendability or flexibility to the detent 55. Such additional flexibility imparted to the detent 55 better enables the detent to be manually snap fit around or over the outer surface of the complementary protrusion or detent 59 of the rail 30 onto which the bumper strip 8 is mounted. The snap fitted mounting of detents 55 onto the protrusions 59 firmly holds the bumper 8 on the rail 30.

The core material 20 typically comprises a mixture of polymer materials that have been previously processed and melted in a prior extrusion or injection molding cycle, e.g. a mixture of scrap materials from previous extrusion cycle runs of one or more selected thermoplastic polymer materials such as polyvinyl chloride (PVC) where each scrap material contains a different concentration/amount of dye material and/or a different durometer or hardness. The subsequent extrusion processing cycle carried out on previously extruded or molded materials causes the composite material now being melted a second time in the course of an extrusion or molding process to assume a lower durometer than the originally extruded product comprising virgin material and/or a greater rubberiness, flexibility or bendability than the original virgin material. The lower durometer of scrap material may also be a result of the scrap materials containing several different dye and other additives such as plasticizers and the like.

As used herein the phrase "melted for the first time" or "first melted" or the like means that the polymer material has not been previously melted during an extrusion or molding process, it being understood that the starting polymer material may have been previously in a molten form as a result of its having been produced/manufactured in the first instance.

The cap coat 10 thermoplastic material selected is preferably virgin polymer material that has not been previously extruded or otherwise melted and typically does not initially contain a dye. The cap coat 10 material upon extrusion has a higher durometer, rigidity and less rubberiness, flexibility and bendability than the core material 20. One or more dye materials that comprise between about 3% and about 10%, e.g. 4-7%, by weight of the cap coat polymer material may be mixed with/added to the thermoplastic starting feed material for the cap coat 10.

The non-shrink strip material 40 is also preferably comprised of a virgin polymer material that has not been previously extruded or otherwise melted. Most preferably, the non-shrink strip material is the most rigid of the three polymer materials and is the most resistant to shrinkage particularly in/along the longitudinal direction of the elongated strip-form product 8. The non-shrink material may comprise the same or substantially the same virgin polymer material as the core 20 material. The rigid strip 40 provides a particular resistance to shrinkage of the core material 20 along the longitudinal or axial length of the elongated extruded strip-like product 8 by virtue of being bonded to the underside of the core 20 strip. Such resistance to shrinkage by virtue of the bonding of the non-shrink strip 40 to the core strip component 20 thus obviates the necessity for replacing edge, end or corner pieces that are typically attached to or mounted at the ends of a finished strip product 8 once installed on a rail 30 in an actual shelf, counter or other retail store environment.

The polymer material selected for use in comprising the cap coat 10 and the core 20 typically comprises the similar basic polymers, mixture of polymers or thermoplastic materials, e.g. thermoplastic polyvinyl chlorides, nylons, polyesters, polyethers, polyamides, rubbers and latex rubber materials and copolymers of one or more of all of the foregoing. That is the polymer materials of which the cap coat 10 and the core 20 are comprised typically have essentially the same units making up the polymer backbone. The polymer material of the cap coat 10 and core 20 materials typically differ somewhat in polymer chain length, degree of cross polymerization (if any) or in concentration and composition of dye materials contained within the matrix of the materials. For example, the virgin cap coat 10 material typically comprises a polymer material having a durometer of between about 75 and 90, e.g. 80-85, and the core layer 20 material comprises a mixture of two or more scrap materials that were originally extruded from the same basic material as the cap coat 10 material containing the same or different dye materials at the same or different concentrations as the cap coat 10 material contains.

Polymer materials suitable for use in the invention are thermoplastic polymers that are relatively pliable or manually bendable such as polyvinyl chloride, polyamide, polyether, polyester and copolymers of all of the foregoing with one or more of each other or with urethane or other polymer units that impart a suitable manual bendability to the end polymer. Stiffeners, plasticizers, catalysts and the like may be contained within the polymer materials to impart any desired degree of flexural modulus, hardness, impact resistance and like mechanical/physical properties to the polymer material.

What is claimed is:

1. An impact resistant bumper device that is elongated along a longitudinal axis and mountable on a mounting member, the device having a cross-section having an open undersurface configuration comprising:
    a first layer of a first polymer material having a first hardness or durometer;
    a second layer of a second polymer material having a second hardness or durometer;
    wherein the first layer is formed into an inner core body having an outer surface and an open undersurface;
    wherein the second layer is formed into a layer bonded to the outer surface of the first layer;
    a third layer of a third polymer material formed into an elongated strip bonded to the undersurface of the first layer;
    wherein the hardness or durometer of the first polymer is selected to be readily manually bendable and compressible;
    wherein the second polymer material has a hardness or durometer greater than the hardness or durometer of the first polymer material;
    wherein the third polymer material has a hardness or durometer and a degree of resistance to shrinkage that is greater than the hardness or durometer and degree of resistance to shrinkage of the first polymer material and resists shrinkage of the device at least along the longitudinal axis of the device.

2. The elongated strip of claim 1 wherein the second polymer material contains at least one selected dye.

3. The elongated strip of claim 1 wherein the first polymer material contains at least two selected dyes.

4. The elongated strip of claim 1 wherein the first and second layers are co-extruded simultaneously through a die and bonded during their simultaneous co-extrusion.

5. The elongated strip of claim 4 wherein the second polymer material comprises a meltable polymer material that is first melted during the co-extrusion and the first and third polymer materials both comprise a polyvinyl chloride polymer material.

6. The elongated strip of claim 4 wherein the first polymer material comprises a meltable polymer material that has been melted at least once prior to the co-extrusion and the first and third polymer materials both comprise a polyvinyl chloride polymer material.

7. The elongated strip of claim 4 wherein the second polymer material contains at least one selected dye.

8. The elongated strip of claim 4 wherein the first polymer material contains at least two selected dyes.

9. The elongated strip of claim 4 wherein the second polymer material comprises a meltable polymer material that is first melted during the co-extrusion and wherein the first polymer material comprises a meltable polymer material that has been melted at least one once prior to the co-extrusion.

10. The elongated strip of claim 9 wherein the second polymer material contains at least one selected dye.

11. The elongated strip of claim 9 wherein the first polymer material contains at least two selected dyes.

12. The elongated strip of claim 9 wherein the third polymer material comprises a meltable polymer material that is first melted during the coextrusion and the first and third polymer materials both comprise a polyvinyl chloride polymer material.

13. An impact resistant bumper device that is elongated along a longitudinal axis and mountable on a mounting member, the device having a cross-section having an open undersurface configuration comprising:
 a first layer of a first polymer material having a first hardness or durometer;
 a second layer of a second polymer material having a second hardness or durometer;
 wherein the first layer is formed into an inner core body having an outer surface and an open undersurface;
 wherein the second layer is formed into a layer bonded to the outer surface of the first layer;
 a third layer of a third polymer material formed into an elongated strip bonded to the undersurface of the first layer;
 wherein the first polymer material has been melted at least once prior to the extrusion cycle;
 wherein the second polymer material is first melted during the extrusion cycle;
 wherein the third polymer material is first melted during the extrusion cycle wherein the first and second layers are co-extruded simultaneously through a die and bonded during the extrusion cycle and wherein the first polymer material has a hardness or durometer selected to be manually bendable and compressible; wherein the second polymer material has a hardness or durometer greater than the hardness or durometer of the first polymer material; and, wherein the third polymer material has a hardness or durometer and degree of resistance to shrinkage that is greater than the hardness or durometer and degree of resistance to shrinkage of the first polymer material, the third polymer material resisting shrinkage at least along the longitudinal axis of the device.

14. An impact resistant bumper device that is elongated along a longitudinal axis and mountable on a mounting member, the device having a cross-section having an open undersurface configuration comprising:
 a first layer of a first polymer material having a first hardness or durometer;
 a second layer of a second polymer material having a second hardness or durometer;
 wherein the first layer is formed into an inner core body having an outer surface and an open undersurface;
 wherein the second layer is formed into a layer bonded to the outer surface of the first layer;
 wherein the hardness or durometer of the first polymer is selected to be manually bendable and compressible;
 wherein the second polymer material has a hardness or durometer greater than the hardness or durometer of the first polymer material;
 wherein the first layer is not visible when the device is mounted on the mounting member; and,
 a third layer of a third polymer material extending along the longitudinal axis that resists shrinkage of the device along the longitudinal axis, the third layer having a hardness or durometer that is greater than the hardness or durometer of the first polymer material.

15. The elongated strip of claim 14 wherein the first and second layers are co-extruded simultaneously through a die and bonded during their simultaneous co-extrusion and wherein the first and third polymer materials both comprise a polyvinyl chloride polymer material.

16. A method of producing an elongated impact resistant bumper comprised of layers of polymeric material, the method comprising:
 selecting a first polyvinyl chloride polymer material that has been melted and cooled to solid form;
 selecting a second polymer material that has not been melted;
 selecting a third polyvinyl chloride polymer material that has not been melted and that has a degree of resistance to shrinkage that is greater than the degree of resistance to shrinkage of the first polymer materials;
 extruding the first and second and third polymer materials simultaneously in molten form through a selected mold or die in first and second and third elongated strips;
 forming the first layer during the extruding into a body elongated along a longitude and having a cross sectional configuration having an outer surface and an undersurface;
 layering the simultaneously extruded first and second strips into contact with each other in their molten form upon exiting the selected mold or die such that the second strip is deposited on the outer surface of the first strip overlying the undersurface of the first strip;
 layering the simultaneously extruded first and third strips into contact with each other in their molten form upon exiting the selected mold or die such that the third strip is deposited on and bonded to the undersurface of the first strip along the elongated longitude of the first strip, the third strip bonding to and resisting shrinkage at least along the elongated longitude of the first strip; and,
 mounting the layered strips onto a mounting member for exposure to and impact with a moving object.

17. A method of producing an elongated impact resistant bumper comprised of layers of polymeric material, the method comprising:
 selecting a first polymer material having a first selected hardness or durometer;
 selecting a second polymer material having a hardness or durometer that is greater than the hardness or durometer of the first polymer material;
 selecting a third polymer material having a hardness or durometer and a degree of resistance to shrinkage that is greater than the hardness or durometer and degree of resistance to shrinkage of the first polymer material;

extruding the first and second and third polymer materials simultaneously in molten form through a selected mold or die in first and second and third elongated strips;

forming the first layer during the extruding into a body having an elongated longitude and having a cross sectional configuration having an outer surface and an undersurface;

layering the simultaneously extruded first and second strips into contact with each other in their molten form upon exiting the selected mold or die such that the second strip is deposited on the outer surface of the first strip overlying the undersurface of the first strip; and, layering the simultaneously extruded first and third strips into contact with each other in their molten form upon exiting the selected mold or die such that the third strip is deposited on and bonded to the undersurface of the first strip along the elongated longitude of the first strip, the third strip resisting shrinkage of the bonded strips along at least the elongated longitude of the first strip; and, forming the layered strips into a configuration of an elongated impact resistant bumper that is mountable on a mounting member.

\* \* \* \* \*

UNITED STATES PATENT AND TRADEMARK OFFICE
CERTIFICATE OF CORRECTION

PATENT NO.         : 8,153,242 B2
APPLICATION NO.    : 12/236107
DATED              : April 10, 2012
INVENTOR(S)        : Wallace et al.

It is certified that error appears in the above-identified patent and that said Letters Patent is hereby corrected as shown below:

Amend col. 7, line 19 as follows:

"has been melted at least one once prior to the co-extrusion" should be -- has been melted at least once prior to the co-extrusion --

Amend col. 8, line 34 as follows:

"shrinkage of the first polymer materials" should be -- shrinkage of the first polymer material --

Amend col. 7, line 49 as follows:

"the extrusion cycle wherein the first and second layers" should be -- the extrusion cycle, wherein the first and second layers --

Signed and Sealed this
Twelfth Day of June, 2012

David J. Kappos
*Director of the United States Patent and Trademark Office*